2 Sheets—Sheet 1.

E. GRAH,

Assignor, by mesne assignments, to J. TREMLETT and A. S. MANN.

SIGN.

No. 10,014. Reissued Jan. 24, 1882.

Attest:
Charles Pickles
Geo. H. Knight.

Inventor.
Emil Grah
By Knight Bros.
Attys.

N. PETERS, Photo-Lithographer, Washington, D. C.

E. GRAH.

Assignor, by mesne assignments, to J. TREMLETT and A. S. MANN.

SIGN.

No. 10,014. Reissued Jan. 24, 1882.

Attest:
Charles Pickles
Geo. A. Knight

Inventor:
Emil Grah
By Knight Bros.
Attys.

N. PETERS, Photo-Lithographer, Washington, D. C.

UNITED STATES PATENT OFFICE.

EMIL GRAH, OF TOLEDO, OHIO, ASSIGNOR, BY MESNE ASSIGNMENTS, TO JOHN TREMLETT AND ALEXANDER S. MANN, OF ST. LOUIS, MISSOURI.

SIGN.

SPECIFICATION forming part of Reissued Letters Patent No. 10,014, dated January 24, 1882.

Original No. 230,268, dated July 20, 1880. Application for reissue filed December 22, 1881.

*To all whom it may concern:*

Be it known that I, EMIL GRAH, of Toledo, in the county of Lucas and State of Ohio, have invented a certain new and useful Improvement in Signs, of which the following is a full, clear, and exact description, reference being had to the accompanying drawings, forming part of this specification.

My invention consists broadly in a plate or disk having a brilliant or glistening face, and vibrated behind a plate having open letters, all of which will be more fully described in connection with the accompanying drawings, in which—

Figure 1:
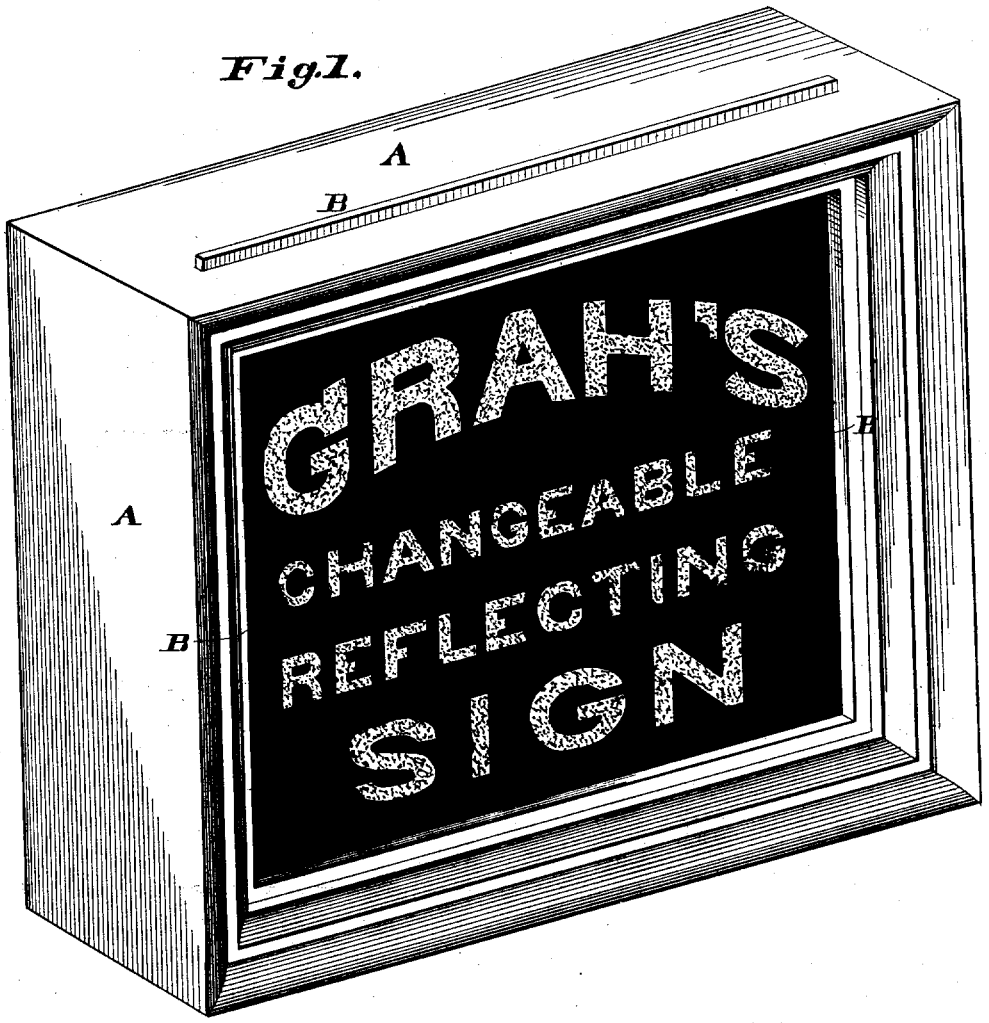
Figure 2:
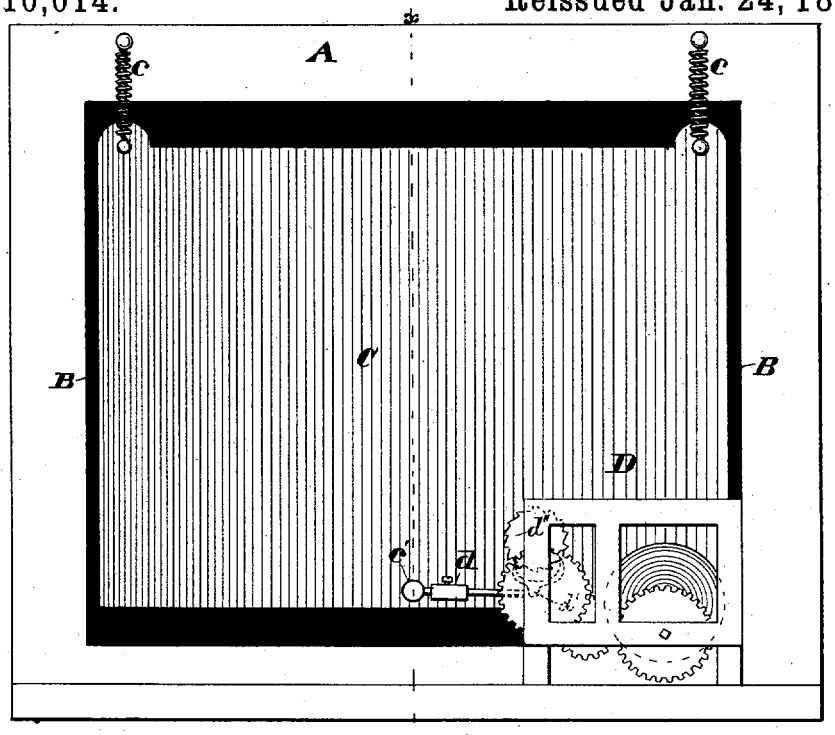
Figure 3:
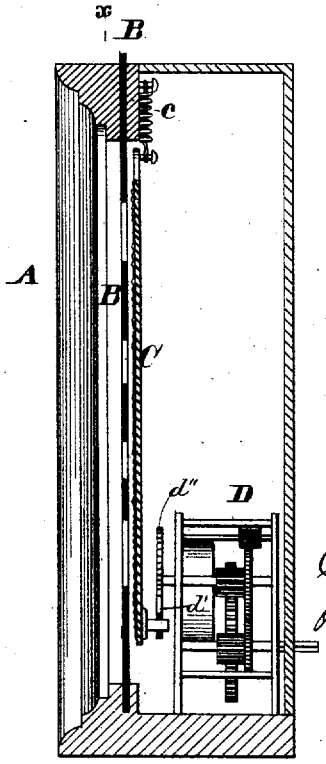

Figure 1 is a perspective view of the improved sign. Fig. 2 is a rear elevation. Fig. 3 is a vertical cross-section through line *x x*, Fig. 2.

A represents a suitable frame, to which is fixed a sheet or plate, B, having open letters, figures, or designs, as shown. Behind the plate B is suspended, preferably by means of springs *c*, a suitable sheet or plate, C, having a brilliant colored face or surface, as before stated. This brilliant surface is particularly attractive if made rough or irregular and silvered or gilded.

D is a clock-work mechanism, located at the rear of the frame, whose actuating-arm *d* works against a stud or eye, *c'*, on the disk or plate C, for the purpose of vibrating the said plate behind the plate B.

The actuating-arm may be made in two pieces or sections, one telescopic within the other, as shown, so that the arm is adjustable in length for giving different kinds of vibrations to the brilliant plate C, the rod or arm *d* having pallets *d'* on its end, which are acted upon by the ratchet-wheel *d''* of the clock-work. Thus it will be plainly seen that the motion imparted to the arm *d* will vibrate the brilliant plate behind the open letters of the plate B, to attract attention to the sign.

The brilliant plate may be of any fancy attractive color, and any number of them may be kept on hand, and one color may be substituted for another by way of variety.

Having thus described my invention, the following is what I claim as new therein and desire to secure by Letters Patent:

1. In a sign, a plate having open letters supported by a suitable frame, in combination with a moving or vibrating brilliant disk or plate, substantially as and for the purpose set forth.

2. The combination of the frame A, plate B, glistening vibrating plate or disk C, springs *c*, and clock-work mechanism D, all made substantially as and for the purpose set forth.

EMIL GRAH.

Witnesses:
J. D. SEAMAN,
FRANCIS E. WRIGHT.